United States Patent [19]

Matsuka

[11] Patent Number: 4,563,623
[45] Date of Patent: Jan. 7, 1986

[54] MOTOR SPEED CONTROL APPARATUS
[75] Inventor: Shigemichi Matsuka, Hitachi, Japan
[73] Assignee: Hitachi, Ltd., Tokyo, Japan
[21] Appl. No.: 523,951
[22] Filed: Aug. 17, 1983
[30] Foreign Application Priority Data Aug. 23, 1982 [JP] Japan .................................. 57-144726
Sep. 20, 1982 [JP] Japan .................................. 57-162356

[51] Int. Cl.⁴ .............................................. G05B 5/00
[52] U.S. Cl. .................................... 318/311; 318/319; 318/326
[58] Field of Search ............... 318/317, 326, 327, 331, 318/345 G, 311, 319

[56] References Cited
U.S. PATENT DOCUMENTS 3,504,260  3/1970  Staples ................................. 318/331
3,624,474  11/1971 Nolf .................................... 318/331
3,878,446  4/1975  Brandt ............................. 318/331 X
4,109,184  8/1978  Weber ................................. 318/327
4,151,450  4/1979  Fukuma et al. ....................... 318/317
4,266,168  5/1981  Andersen ............................. 318/331

FOREIGN PATENT DOCUMENTS 57-78384  5/1982  Japan .

Primary Examiner—Ulysses Weldon
Attorney, Agent, or Firm—Antonelli, Terry & Wands

[57] ABSTRACT

A motor is controlled by pulse signals applied to the gates of thyristors in a thyristor switching circuit. The speed of the motor is detected by a speed detector, and the instantaneous speed of the motor is calculated on the basis of the current detection speed obtained at the present time and the detected speed obtained at least at one prior point of time. The speed control signal for the motor is calculated on the basis of the deviation between the instantaneous speed and an output signal of a speed directive apparatus. In accordance with the speed control signal, the pulse signals applied to the gates of the thyristors are outputted from a gate pulse generator.

4 Claims, 15 Drawing Figures

MOTOR SPEED CONTROL APPARATUS

BACKGROUND OF THE INVENTION

The present invention relates to a motor speed control apparatus, and more particularly to a motor speed control apparatus which is well-suited for achieving quick response in a digital control.

A motor speed control apparatus, for example, has been disclosed in Japanese Laying-open of Patent Application No. 57-78384 (1982) entitled "Digital Control Apparatus for D.C. Motor" published in May 17, 1982.

This is concerned with a motor speed control apparatus which controls the speed of a motor by pulse signals given to gates of thyristors. The pulse signal corresponds to an ignition phase angle which is decided by a predicted value calculated in accordance with a relationship using armature currents of the motor in a certain sampling point of time and the past two sampling points of time for preventing speed control delay of the motor based on a calculating period of the control apparatus.

However, this prior art does not disclose how to determine an ignition control angle by predicted motor speed based on a plurality of motor speeds.

SUMMARY OF THE INVENTION

The object of the present invention is to provide a motor speed control apparatus which has no control delay and is of equivalent economy, in which past sampling data relating to motor speed is stored and is used for predicting the motor speed at the time when a control calculation result is transmitted to the controlled system.

In order to accomplish the above-mentioned object, the present invention is characterized in that actual status data of a controlled system at a plurality of past sampling points of time including the newest sampling point of time is stored, that the plurality of data is used for deriving a time function descriptive of the status of the controlled system satisfying the plurality of data through comparatively simple processing, that the status of the controlled system at the point of a fixed period of time after the newest sampling point of time, at which a control calculation result is transmitted to the controlled system, is predicted and calculated on the basis of the time function, and that an actual control calculation is performed on the basis of a result of the predictive calculation, whereby a control delay attributed to the processing speed delay of the arithmetic processing unit of the computer or the like is obviated so as to bring forth a favorable control result.

DESCRIPTION OF THE PREFERRED EMBODIMENT

Figure 1:
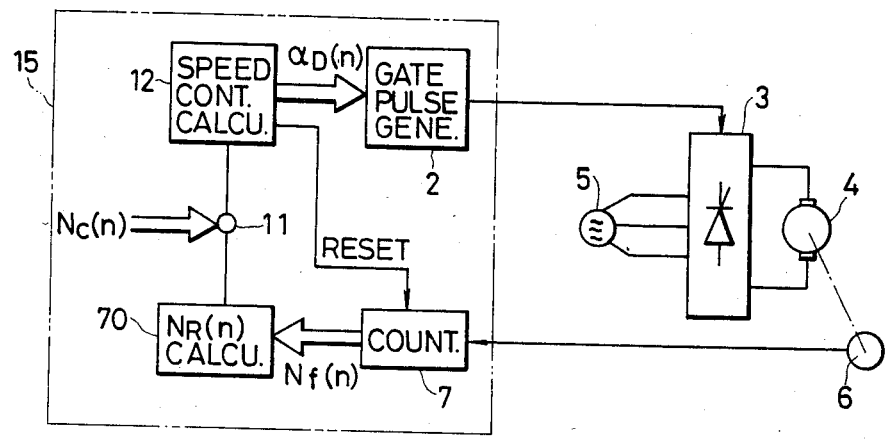
FIG. 1 is a block diagram of a digital type motor control apparatus of the present invention which controls speed of motor on the basis of predicted motor speed.

Referring to FIG. 1, the motor speed control apparatus of the present invention comprises a so-called thyristor Leonard control apparatus 15. This apparatus 15 detects the output signal of the incremental encoder 6 which measures the speed of the motor 4, and controls the motor speed on the basis of a control signal which is applied to gates of thyristor converter 3. Electric power is applied from source 5 to the thyristor converter 3.

The thyristor Leonard control apparatus 15 consists of the counter 7 which detects motor speed from the encoder 6, $N_R(n)$ calculator 70 which calculates the instantaneous speed of the motor 4, and the speed control calculator 12 which outputs signal $a_D(n)$ to the gate pulse generator 2 after performing a speed control calculation by using a measured deviation value between the instantaneous speed $N_R(n)$ and the output signal $N_C(n)$ from the speed directive apparatus (not shown).

If the thyristor Leonard control system 15 is constructed of analog computing elements, the analog computing element would have the disadvantage that the required precision of a plant to which it is applied is not met in point of its control precision attributed to the drift of an electric signal, although the element has a high response rate in a control calculation. On the other hand, when it is constructed of digital computing elements, the direct control by the digital computer is remarkably improved in the aspect of precision as compared with an analog computer employing a linear IC. But, the digital computer, in the present situation, is inferior to the analog computer in the aspects of control response and price. More specifically, from the viewpoint of the control response, the analog computer is such that the sampling pitch of the sampling control by the microcomputer is infinitely shortened, and the control by the digital computer is essentially inferior to the analog computer in its responsiveness. Meanwhile, since the digital computer is controlled by "1" or "0", it is immune against such electrical problems as drift and noise in comparison with the analog computer. Moreover, the control precision of the digital computer is improved by increasing the number of bits. It is the present invention that makes the best use of the merits of the digital computer in the aspect of precision and causes the digital computer to demonstrate a performance equivalent or superior to that of the analog computer in the aspect of response.

When the thyristor Leonard control system 15 shown in FIG. 1 adopts the digital computer, digital calculation has to take place in a certain sampling pitch of time.

According to the present invention, the actual speed $N_R(n)$ at a point of time n is predicted using a detection value $N_f(n)$ at the point of time n and detection values $N_f(n-1)$, $N_f(n-2)$, ... before this point of time, and the predicted value is used as a speed feedback signal, thereby to eliminate the delay of the detected part.

First, a speed detection value $N_f(n)$ is received from the counter 7 at a step 20. This value is the count value of the output pulses of the incremental encoder 6 having arrived during the period from $(n-1)T$ to $nT$, and signifies the average speed within this period. Subsequently, the counter 7 is reset at a step 21.

The step 22 performs the calculation of predicting the speed detection value $N_R(n)$ at the point of time nT on the basis of the present detection value $N_f(n)$ and the preceding detection values $N_f(i)$ (i=1, 2, ..., and n−1). For example, in a case where the speed change of the motor occurs within the sampling period T for the control and where the motor can be assumed to accelerate or decelerate rectilinearly, the following equation may be used as $N_R(n)$:

$$N_R(n) = N_f(n) + \frac{N_f(n) - N_f(n-1)}{2} \quad (1)$$

Figure 3:
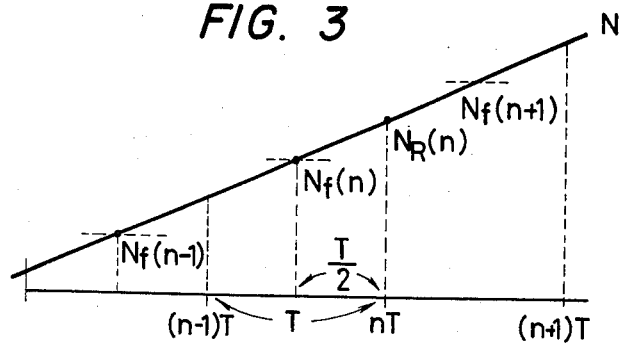
FIGS. 3, 4, 5 are diagrams for explaining speed detection methods of the present invention shown in FIG. 1.

With this equation (1), $N_R(n)$ signifies the speed detection value at the point of time nT with regard to the speed change of the motor as shown in FIG. 3. Further, a speed command $N_c(n)$ is received at a step 23. Using the predictive computation value $N_R(n)$ as the speed feedback signal, the step 24 performs the speed control calculation to find the control angle $\alpha_D$, which is set in the gate pulse generator 2. The speed control calculation is performed using the command $N_c(n)$ and detection value $N_f(n)$ thus received, and the result $\alpha_D(n)$ is set in the gate pulse generator circuit 2. The gate pulse generator circuit 2 produces the gate pulses of a thyristor constituting the thyristor converter 3, so as to apply the voltage of the power source 5 to the motor, thereby to control the speed of the motor. Such processing from the step 20 to the step 25 is executed every period of time T, and $\alpha_D(n)$ is set in the gate pulse generator circuit 2 after the time $\Delta T$ of the processing. Further, the step 26 stores the speed detection value $N_f(n)$ so that it may be usable in the next predictive calculation. The above processing is executed every period T, to control the speed of the motor.

With the control thus far described, the dead time is not involved in the part where the motor speed is detected, so that the response rate can be enhanced stably. Another effect is that the calculation of Equation (1) consists only of shift and addition as well as subtraction for the microcomputer 1 and can be processed in a very short time.

Figure 4:
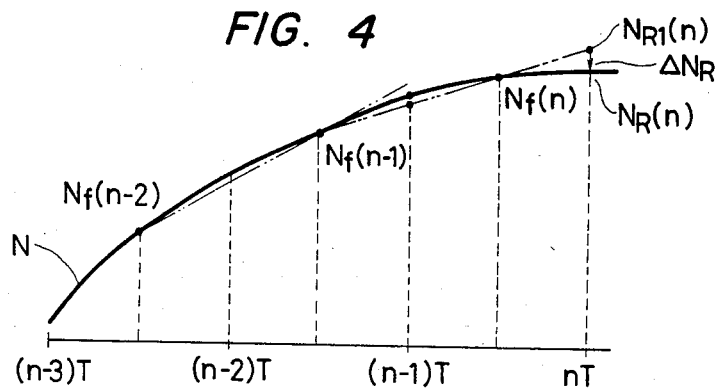

Further, in a case where the speed N of the motor changes curvilinearly as shown in FIG. 4, $N_R(n)$ can be more accurately predicted when computed in accordance with the following equation by using the present detection value to the detection value before last; $N_f(n-2)$, $N_f(n-1)$ and $N_f(n)$:

$$N_R(n) = N_{R1}(n) + \Delta N_R \quad (2)$$

where $$N_{R1}(n) = N_f(n) + (N_f(n) - N_f(n-1))/2 \quad (3)$$

$$\Delta N_R = \frac{(N_f(n) - N_f(n-1)) - ((N_f(n-1) - N_f(n-2))}{2} \quad (4)$$

In Equation (2), $N_{R1}(n)$ is the prediction value conforming to Equation (1) and is greatly different from the actual value. In contrast, when the variation $\Delta N_R$ between the difference of $N_f(n-2)$ and $N_f(n-1)$ and the difference of $N_f(n-1)$ and $N_F(n)$ is compensated, $N_{R1}(n)$ becomes $N_R(n)$ of smaller value, which can be brought closer to the actual speed N at the point of time nT.

Thus, even when the speed change of the motor cannot be deemed rectilinear, the use of Equation (2) makes it possible to obtain the prediction value $N_R(n)$ approximate to the actual speed of the point of time nT.

Further, in a case where the motor speed changes according to a specified curve as in a resonance phenomenon, a specified calculating formula with the changing waveform taken into consideration is used for the computation in the step 22. Then, the prediction value $N_R(n)$ becomes a value close to the actual speed, and a speed detection of small detection delay is permitted.

Figure 5:
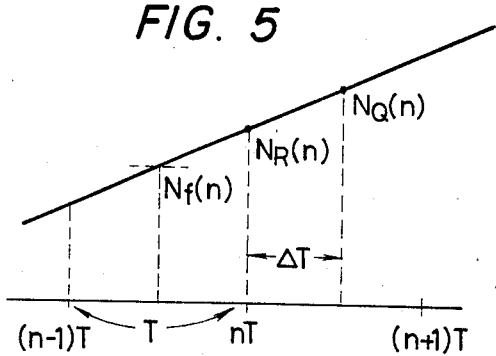

Further, FIG. 5 is an explanatory diagram for elucidating another embodiment. The speed control calculator 12 outputs $\alpha_D(n)$ at the execution of the processing of FIG. 2. For this reason, the result of the control calculation is reflected upon the application of the voltage of the motor after the lapse of the processing time $\Delta T$ from the point of time nT. Therefore, when a speed detection value later by $\Delta T$ than nT is predicted so as to control the motor speed therewith, a dead time attributed to the control calculation is also avoided, and the response rate of the control system can be further raised.

For example, in a case where the motor speed increases or decreases rectilinearly, the following equation may be used:

$$N_Q(n) = N_f(n) + \left(\frac{1}{2} + \frac{\Delta T}{T}\right)(N_f(n) - N_f(n-1)) \quad (5)$$

Figure 2:
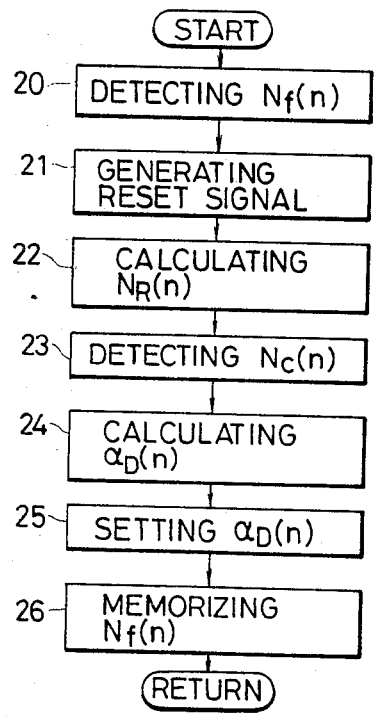
FIG. 2 is a flow chart of a motor speed control apparatus shown in FIG. 1.

When this equation is calculated at the step 22 of FIG. 2 and the control calculation is performed at the step 24 by using the resulting $N_Q(n)$ instead of the value $N_R(n)$, a speed control system of still better response can be constructed.

As set forth above, according to the present invention, a detection time delay in a speed detection which exploits the variation of a position detector can be eliminated. This brings forth the effect that the response of a digital type speed control apparatus for a motor can be stably quickened.

Figure 6:
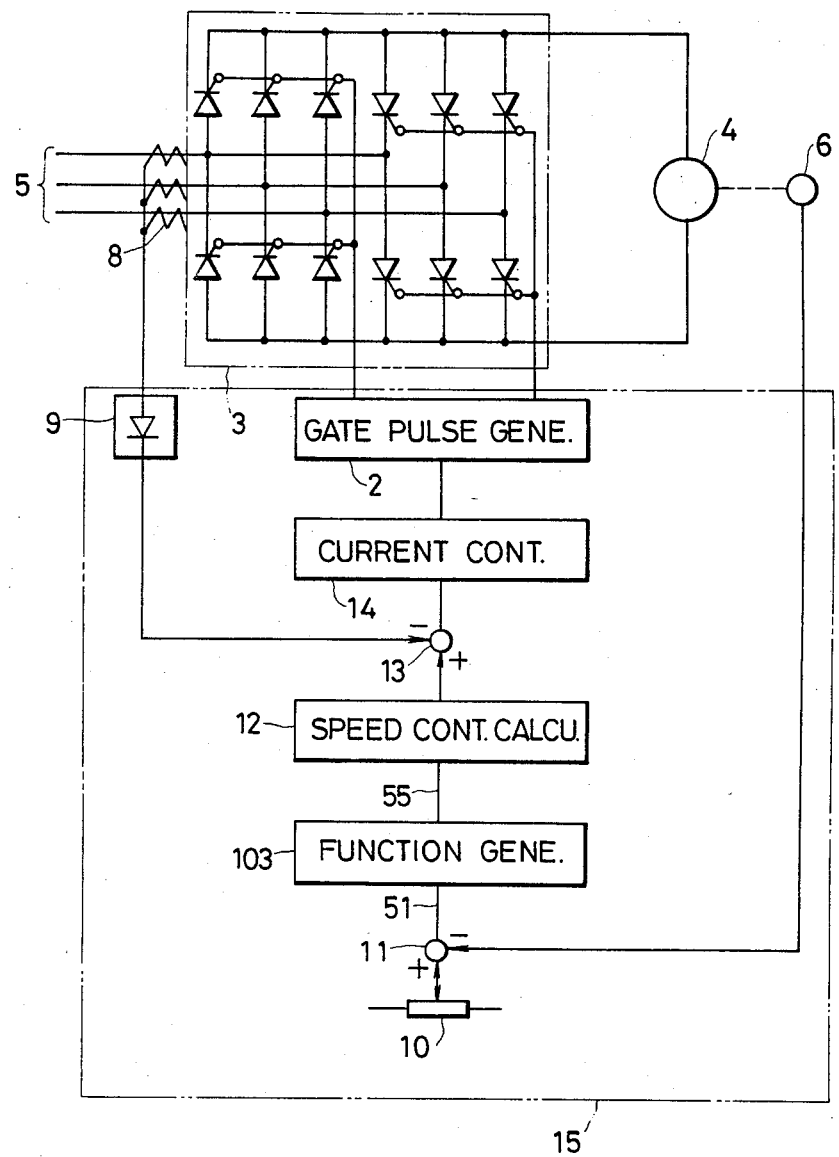
FIG. 6 is a block diagram of another digital type motor control apparatus of the present invention comprising a major loop speed control system which has the function of predicting motor speed, and a minor loop current control system which controls motor speed on the basis of a measured deviation between an output signal of the major loop speed control system and armature current of the motor.

FIG. 6 shows the 2nd embodiment of the present invention. In FIG. 6, the same parts as in FIG. 1 are indicated by the same symbol. Numeral 8 is an alternating current detector, numeral 9 is a device which converts the alternating current 8 into direct current, numeral 10 is a speed command unit which serves for the speed control of the D.C. motor 4, numeral 11 is a device which compares the speed command and a speed feedback value, numeral 12 is a speed calculation control unit, numeral 13 is a unit which compares and calculates a current command and a current feedback value for a current control system 14 constituting the minor loop of the present speed control system. Numeral 103 is a function generator shown in FIG. 9B. In the present invention shown in FIG. 6, the major loop speed control system consists of the function generator 103 and the speed control calculator 12.

The average operating speed of the digital computer is 3-μs/step. For example, when the processing of 1000 steps is performed, a time of 3-5 ms is taken. While the sampling processing is being performed, the control is held at a preceding value and does not change.

By way of example, when a thyristor Ward-Leonard system based on a 3-phase 50-Hz A.C. power source, which is used most often at present, is considered, an ignition pulse for a thyristor must be produced every 3.3 ms, and hence, the operating processing of the minor loop current control system 14 must be ended within 3.3 ms. A sample-and-hold circuit of 3.3 ms gives a phase delay which corresponds to a dead time of $\omega T/2$. Therefore, when the sampling pitch T is selected at 3.3 ms, a phase delay of 58 degrees arises for a cutoff angular frequency of $\omega = 606$ rad/sec. When the other delays of the control system are taken into account, it is difficult to realize a response performance equivalent to the analog control of a cutoff angular frequency of $\omega_c = 100$-500 rad/sec, and $\omega_c = -100$ rad/sec is the limit. On the other hand, the operating processing of the major loop speed control loop approximately 12 requires a processing time approximately equal to that of the minor loop current control system ordinarily. Therefore, the sampling pitch of the major loop speed control system is usually selected to be 3-5 times that of the current control system (that is, about 10-15 ms). When the priority level of the operation of the speed control system is set to be lower than that of the current control system, so as to execute the processing of the speed control loop in the intervening time of the processing of the current control loop the cutoff angular frequency $\omega_c$ becomes 4-20 rad/sec which is the limit similarly to the current control system in the sampling pitch of 10 ms.

In the motor speed control, the speed does not suddenly change as the armature current of the motor because of the presence of the inertia of the motor itself and the load thereof. Accordingly, a value predicted by extrapolation from a preceding sampled value and a present sampled value is sufficiently practical within one sampling period. When, using this value, a predictive value for 10 ms is calculated to be outputted to the current control system, the sampling pitch of the current control system and that of the speed control system come into agreement, and equivalently the response of the speed control system can be enhanced up to a level equal to that of the current control system. This does not mean that the speed control system is equalized to the current control system in response. The present invention intends that the response limit of the speed control system is capable of being raised up to 50-100 rad/sec, whereby a response of 30 rad/sec required of the system can be attained. Of course, this operating processing needs to be very simple as indicated below unlike the normal operating processing of the speed control system, so as not to take any additional processing time.

In an embodiment of the present invention, the step of a predictive operation control shown in FIG. 7 is added in the form of the function generator 103 of the major loop speed control system of FIG. 6 explained before, values in the sampling pitch of the speed control are calculated in conformity with the sampling pitches of the current control and outputted as current commands, whereby the equivalent response of the speed control system is raised.

Figure 7A:
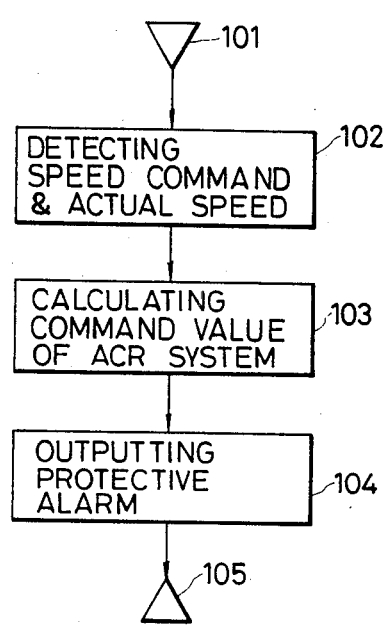
FIG. 7A is a flow chart of the major loop speed control system shown in FIG. 6.
Figure 7B:
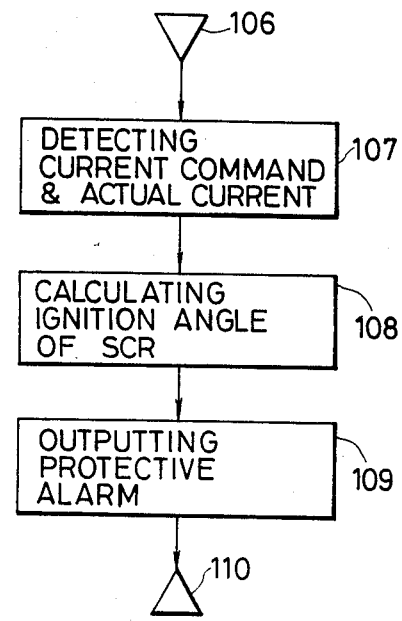
FIG. 7B is a flow chart of the minor loop current control system shown in FIG. 6.
Figure 7C:
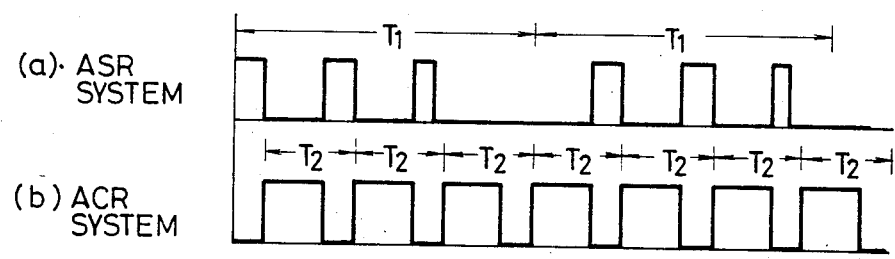
FIG. 7C is a time chart of the control system shown in FIG. 6.

FIG. 7A indicates the calculation of the speed control system (ASR system) forming the major loop of the control, and FIG. 7B that of the current control system (ACR system) forming the minor loop of the control. Since the ordinary control system secures the stability of the major loop by raising the response of the minor loop, the sampling pitch $T_1$ of the ASR system is selected to be several times longer than the sampling pitch $T_2$ of the ACR system. That is, several sampling control calculations of the minor loop are executed during one sampling control calculation of the major loop. This signifies that, as to the control calculations resorting to the digital computer, the ACR system of the minor loop is higher than the ASR system of the major loop in the level of the control calculation. Thus, even in the course of the execution of the control calculation of the major loop, when a time for the sampling control calculation of the minor loop has come, the control calculation of the major loop being executed is temporarily ceased, and the interrupting control calculation of the minor loop is completely executed, whereupon the control calculation of the major loop is started and executed again. This relationship is shown in FIG. 7C in the form of a time chart. As shown in FIG. 7A, however, the control calculation is performed in the major loop, the ASR system every fixed sampling time $T_1$ in such a manner that a speed command and an actual speed are loaded at a step 102 on the basis of calculation indication 101 of the ASR system, and that the control calculation is performed on the basis of the deviation between the speed directive signal $N_c(n)$ and the detected speed signal $N_f(n)$ at a step 102, the result of this calculation being the current command of the ACR system of the minor loop in FIG. 7B. At a step 104, protective alarm for the ASR system is outputted from 105. On the other hand, the minor loop ACR system reads out the current command at a step 107 by the calculation directive signal of 106, and detects current from the AC-DC convertor 9. At a step 108, the ignition angle calculation for the thyristors 3 is taken place on the basis of the detected value of the armature current of the motor 4. At a step 109, protective alarm for the ACR system is outputted from 110. In the ACR system (FIG. 7B) of the minor loop, the control calculation is performed at every sampling pitch $T_2$ which is shorter than sampling pitch $T_1$ for the ASR system, and a current command value indicated in a block 107 is the control calculation result outputted from the ASR system (FIG. 7A). That is, while a plurality of control calculations of the minor loop are executed, only one control calculation of the major loop is carried out. As a result, the command value for the control of the minor loop remains constant in the meantime. Although the sampling pitches of the minor loop and the major loop can really be equalized by employing a faster computer or a plurality of computers, the situation of the operation described above is the result of trade-off arising from the processing speed of the actual microcomputer and economical restriction.

Figure 8:
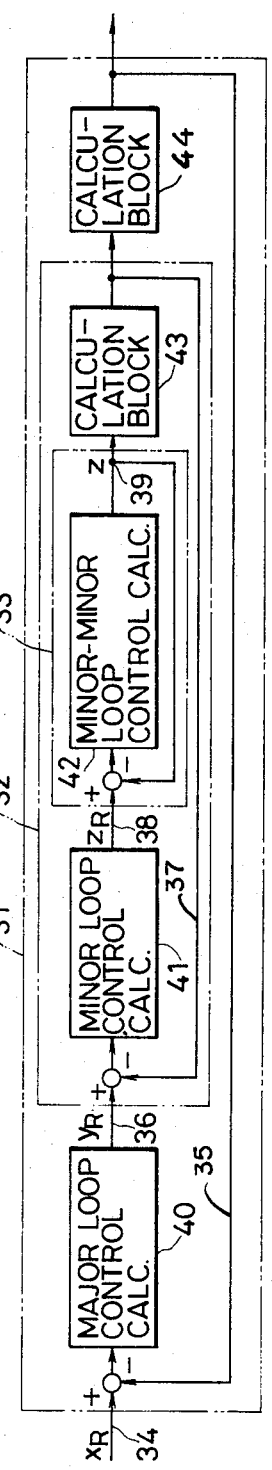
FIG. 8 is a block diagram of digital calculation processing system shown in FIG. 6.

The present invention provides an expedient which demonstrates a more excellent control performance under the restrictions of the processing speed of the actually existing computer and economy. FIG. 8 shows a more general form by amplifying the example of the digital calculation processing of the thyristor Leonard system illustrated in FIG. 6 and FIG. 7. FIG. 8 shows a case where a minor loop 32 and a minor minor loop 33 are included in the major loop 31 of the whole control system. The command value and feedback value (actual value) of the major loop are respectively denoted by numerals 34 and 35, those of the minor loop by numerals 36 and 37, and those of the minor minor loop by numerals 38 and 39. A block 40 is the control calculation portion of the major loop, a block 41 is that of the minor loop, and a block 42 is that of the minor minor loop. Numerals 43 and 44 indicate calculation blocks following the respective feedback values. It is necessary that, in such ordinary control system having minor loops, the inner loop is set at a higher response rate than the outer loop so as to attain the stability of the whole system. Accordingly, in a case where the present control system is performed by the digital control which executes serial processing with a single processor, the inner loop needs to have its sampling pitch rendered shorter. There is no problem when the operation of a control system is slow and a controlled system can be satisfactorily processed with the single processor. However, in a case where fast calculation processing is required as in the motor speed control stated before, it is difficult to conform the sampling pitch of the outer loop to that of the inner loop of faster processing. In this regard, the control calculation result of the outer loop becomes the control command of the inner loop, and actually the control command of the inner loop remains unchanged due to the restriction by the sampling pitch of the outer loop. As a result, the executed control of the inner loop does not follow an actual status change, so that a control delay arises to degrade the performance. Here, the problem will be studied again as to the example of the thyristor Leonard system shown in FIGS. 6 and 7. The sampling pitch $T_1$ of the outer loop of the thyristor Leonard system is determined by the processing speed of the computer and also by the precision of speed measurement. In case of performing the digital processing, a speed is detected by the measurement of a digital signal from a precisional requirement. Herein, a certain measuring period of time is necessary for securing the precision, and this restriction makes it difficult to shorten the sampling interval. On the other hand, in the current control system of the minor loop, various complicated control computations are performed during a period after the measurement of current in its instantaneous value and before the actual generation of a gate pulse determining a thyristor ignition angle. An actual current measurement value is necessary for the control computations, and a certain period of time has lapsed upon end of the control calculation based on the measurement value. Thus, in spite of the change of the physical phenomenon, the control is performed on the basis of the past data. A control delay arises, and the increase of a control gain for enhancing the performance is difficult. As understood from these examples, it can be generally said that a good control of slight delay is conducted by predicting a status at the provision of an actual control output from a value measured every sampling pitch and performing the control on the basis of the predicted result. Moreover, these predictive computations need to be simple ones which do not hinder the processing performance of the whole system.

Figure 9A:
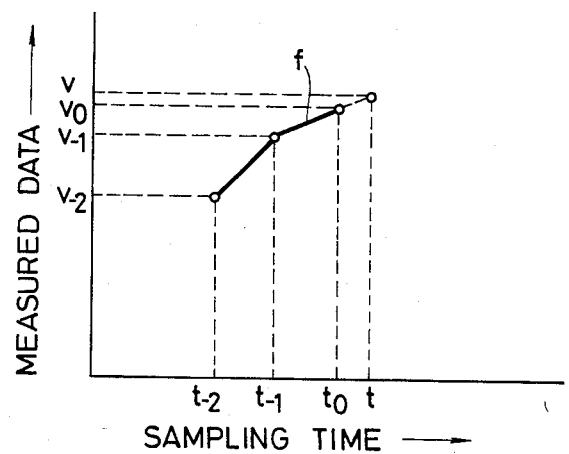
FIG. 9A is a diagram of sampled data within a plurality of sampling points of time.

Proposed as an embodiment of the present invention is a system wherein, in each outer loop, a functional formula approximating a status is formed as a quadratic equation by the use of the data of three past sampling points including the newest sampled data and is used for predicting the situation at the point of time at which the control calculation ends. Of course, as the number of the past data to be used increases, the precision of the prediction rises further, but the precision is not enhanced in proportion as the calculating period of time increases. An embodiment of the present invention is shown in FIG. 9. As seen from FIG. 9A. the axis of abscissas is a sampling time axis, on which $t_0$ denotes the newest sampling time, $t_{-1}$ the last sampling time and $t_{-2}$ the sampling time before last. The axis of ordinates indicates the actual measurement data $v_0$, $v_{-1}$ and $v_{-2}$ of a controlled system actually measured at the respective sampling times. Calculating formulas which give the quadratic approximation function forms f from the actual measurement values of the past three points including the newest sampling time $t_0$ are represented as follows:

$$f(t_0) = v_0 = a\ t_0^2 + b\ t_0 + c \tag{6}$$

$$f(t_{-1}) = v_{-1} = a\ t_{-1}^2 + b\ t_{-1} + c \tag{7}$$

$$f(t_{-2}) = v_{-2} = a\ t_{-2}^2 + b\ t_{-2} + c \tag{8}$$

Since t and v are given, the above equations (6)–(8) are readily solved as simultaneous equations whose variables are the coefficients a, b and c of the quadratic equations. The coefficients a–c of the approximating quadratic equations f(t) are accordingly evaluated, so that the functional form is generally given by:

$$f(t) = a\ t^2 + b\ t + c \tag{9}$$

In the sampling control system employing the digital computer or the like, the sampling pitch is restricted by a content to be processed and a processing speed. In a case where a control output is provided by actually performing a necessary processing calculation with the sampled data, a delay $\Delta t_1$ with respect to the sampling time is involved. Further, in a case where a drive system is actuated with this output, the operating delay $\Delta t_2$ of the drive system is involved. That is, a time delay $\Delta t$ till the completion of the control after the sampling of the data is expressed by the following equation:

$$\Delta t = \Delta t_1 + \Delta t_2 \tag{10}$$

Here, when the content to be processed has been decided, the calculation processing delay $\Delta t_1$ can be evaluated from the processing speed of the computer or the like and becomes a fixed value. Also, when the drive equipment has been decided, the operating delay $\Delta t_2$ of the drive system is determined from the characteristics thereof. As a result, the delay $\Delta t$ of Equation (10) is determined. Accordingly, the control delay attributed to the restriction of the sampling pitch can be removed by predicting the time of the actual execution of the control from the sampled data and executing the control by the use of the predicted value. That is, the value to be used instead of the newest sampled data $v_0$ is given by:

$$f(t) = f(t_0 + \Delta t) \tag{11}$$

$$= a(t_0 + \Delta t)^2 + b(t_0 + \Delta t) + c$$

Figure 9B:
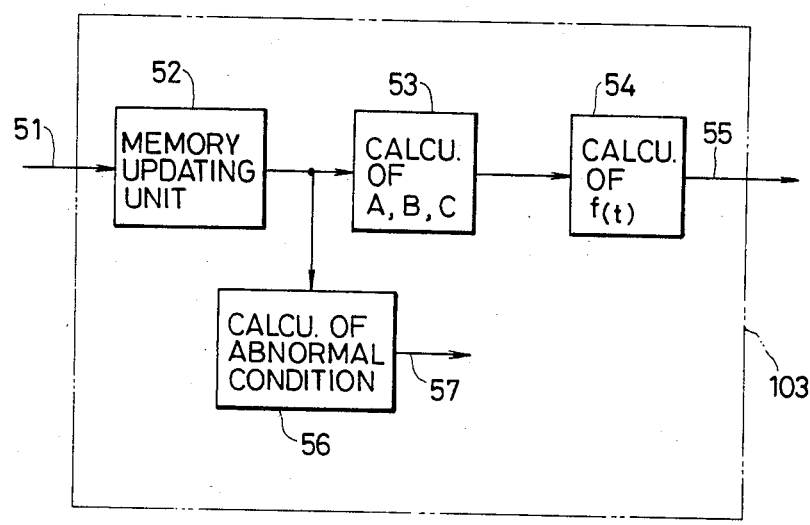
FIG. 9B is a block diagram of the function generator shown in FIG. 6.

A device for executing such predictive calculation is shown in FIG. 9B. In the figure, numeral 51 designates the data of the controlled system which is received every sampling pitch, and numeral 52 a unit which stores and updates the signals. Since the quadratic approximation is performed in case of the above example, the unit stores the data of the past three times including the newest sampling time $t_0$ and has the function of discarding the old data three sampling times ago every sampling and of updating it to the new one. Numeral 53 indicates a calculator which solves Equations (6) to (8) to decide the constants a–c and which finally determines the approximation function (9). Numeral 54 indicates a unit which calculates Equation (11) in such a manner that the time delay $\Delta t$ till the completion of the control after the provision of the control calculation output at the present sampling time is considered in the approximation function determined by the unit 53. Numeral 55 indicates the calculated result $f(t) = f(t + \Delta t)$ of the unit 54.

That is, the present invention does not use the raw data at each sampling time, but it predicts the future tendency of the data of the controlled system from the past data and performs the control calculation by the use of the predicted value, thereby intending to eliminate the control delay attributed to the time restriction determined from the processing speed of the computer or the like.

As apparent from the description thus far made, the approximation equation becomes more precise as the degree is further increased, and the solving method is easy because of the simultaneous equations of degree N. However, the present system has been originally produced in view of the fact that the sampling pitch cannot be shortened due to the processing speed of the computer or the like and the economical restriction, and it is meaningless if the sampling pitch extends due to the application thereof. Accordingly, at most the cubic approximation falls within a practical range. Since the precision is inferior with the linear approximation, the quadratic equation has been used in the embodiment. In general, the disturbance of a control system appears as a sine-wave function. In this case, at least the quadratic equation is desirable for the approximation in point of the precision.

The second feature of the present invention is as stated below. When, in the case of predicting the operation of the controlled system with the approximation formula as described above, the variation of the data is large due to the abnormality of the control or the like, this situation can be readily judged from the data stored in the unit 52. That is, by calculating:

$$\frac{v_0 - v_{-1}}{t_0 - t_{-1}} > L \quad (12)$$

the abnormality of the control system can be detected early. Another merit is that, owing to this function, a risk inherent in the predictive control can be prevented beforehand. More specifically, numeral 56 in FIG. 9B indicates a unit for calculating Equation (12). When the result has exceeded the limit value L previously given, the unit 56 provides a signal 57 for issuing an alarm or tripping the control system. Equation (12) is a very simple calculation in the processing of the computer or the like, and does not result in interfering with the restriction of the sampling pitch.

Although the embodiment has explained the example in which the quadratic equation approximation is performed on the basis of the data of the past three points including the present sampling point of time, the equation need not be quadratic as already explained. In general, the approximation of the equation of degree n is applicable. As the extent of the approximation is raised by increasing the degree, the precision is enhanced more. However, the processing period of time lengthens, and the expedient becomes meaningless when it exceeds the limited processing time which is the essential aim of the present invention. In that sense, the quadratic equation approximation mentioned above is the most effective.

The present invention brings forth the two effects of improving economy and control performance that the high cost of a control apparatus is avoided and that the degradation of the control performance attributed to the restriction of a sampling pitch arising from a processing delay is prevented.

Figure 10A:
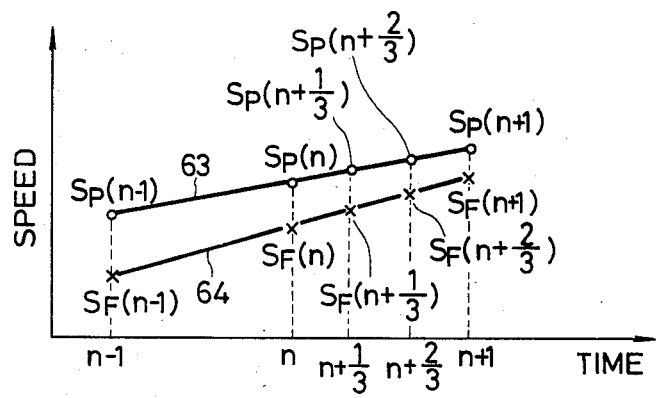
FIG. 10A is a explanatory graph showing how to get predicted value of motor speed in a certain point of time in case of practicing the steps indicated by the flow chart shown in FIG. 10B.
Figure 10B:
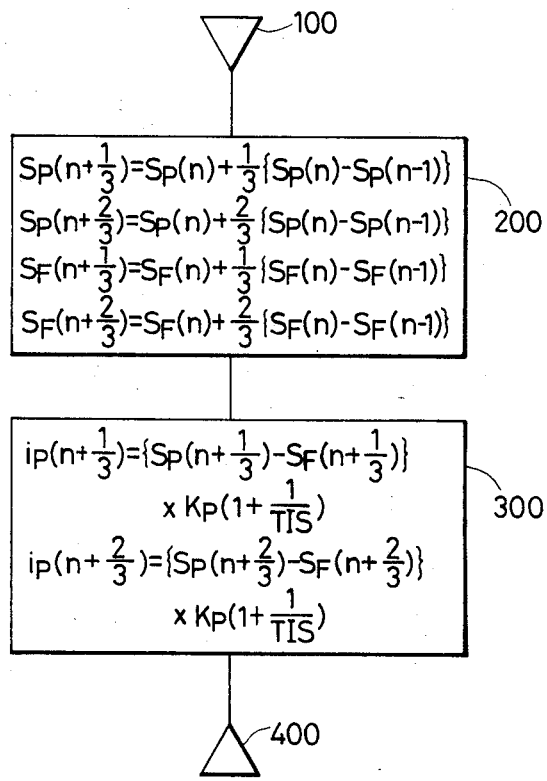
FIG. 10B is another flow chart of the major loop speed control system shown in FIG. 6.

The flow chart shown in FIG. 10B is also able to apply for the major loop speed control system shown in FIG. 6. In FIG. 10A, the axis of abscissas is a time axis. $n-1$, n and $n+1$ indicate the $(n-1)$-th, n-th and $(n+1)$-th sampling times of the speed control system, respectively. The intervening period between the adjacent sampling times is selected to be integral times the sampling interval of the current control system. In the present example, the sampling pitch of the current control system is set at 3.3 ms for the 50-Hz system, and that of the speed control system at 9.9 ms being three times as long as the former. The axis of ordinates is a speed axis which denotes the magnitudes of the command value 63 and feedback value 64 of the major loop speed control system. When the n-th sampling control operations of the speed control system have now been performed, the predictive calculations of the values of two points intervening before the next sampling time, namely, the speed command values and speed feedback values of points $n+\frac{1}{3}$ and $n+\frac{2}{3}$ are executed as in a block 200 of FIG. 10B by the use of the sampled values of the preceding time and those of the present time. Subsequently, the basic calculations of the speed control system are executed as in a block 300, and they are used as the $(n+\frac{1}{3})$-th and $(n+\frac{2}{3})$-th current command prediction values of the current control system. In the illustrated example, they are indicated by the proportional-plus-integral control $$K_p\left(1 + \frac{1}{T_I S}\right)$$

which is used oftenest. Blocks 100 and 400 are blocks which signify start end, respectively.

Figure 11:
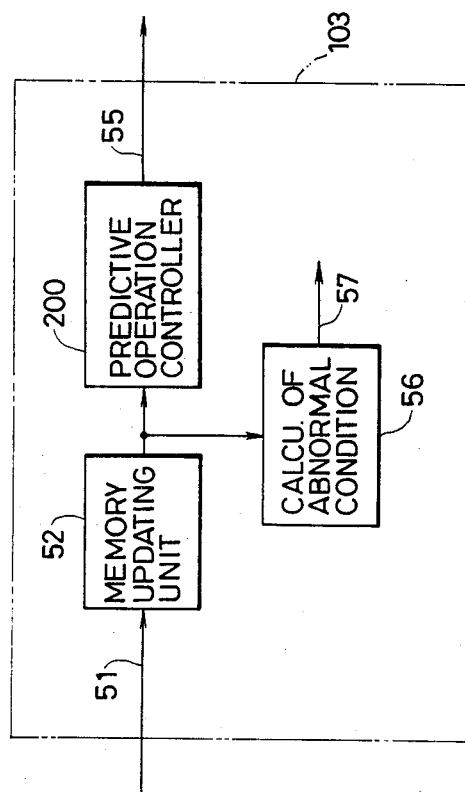
FIG. 11 is a block diagram of a function generator in case of practicing the steps indicated by the flow chart shown in FIG. 10.

In FIG. 11, the same parts as in FIG. 9B are indicated by the same symbol. Numeral 200 is a predictive operation controller for practicing the flow chart shown in FIG. 10.

According to this embodiment, the response performance of the motor speed control by the digital direct control, having heretofore been restricted by the operation processing time, can be enhanced to about 1.5 times compared with prior digital speed control apparatus. Also, since the variation of the current command to be given at each sampling time can be reduced to about ⅓, the overshoot and variation of the current of the current control system can be reduced, so that the response performance of the current control system can be enhanced and that the chances of overcurrent accidents can be lessened. The economy of the embodiment is equivalent to that before the introduction of the present invention.

As set forth above, according to the present invention, a motor speed control of quick response can be realized.

What is claimed is:

1. A motor speed control apparatus for use in controlling the speed of a motor by means of pulse signals applied to the gates of thyristors in a thyristor switching circuit for selectively applying AC current to said motor, comprising:

speed detector means for producing a signal having a detection value $N_f(n)$ representing the measure of the speed of said motor in each of a succession of predetermined sampling periods;

first calculating means for producing a signal representing the instantaneous speed $N_R(n)$ which is predicted to occur at a predetermined time following each time a detection value $N_f(n)$ has been obtained from said speed detector means, the instantaneous speed $N_R(n)$ being a predicted value based on the most current detection value $N_f(n)$ and at least one of the detection values $N_f(i)$ obtained at a prior point of time; and second calculating means for producing a speed control signal to be applied to a gate pulse generating circuit for generating a pulse signal for control of said gates of said thyristors on the basis of the deviation between the output signal of said first calculating means and an output signal of a speed directive apparatus.

2. The motor speed control apparatus as defined in claim 1, wherein said first calculating means includes means for calculating $N_R(n) = (3 N_f(n) - N_f(n-1))/2$ using said most current detection value $N_f(n)$ and the immediately preceding detection value $N_f(n-1)$.

3. The motor speed control apparatus as defined in claim 1, wherein said first calculating means includes means for calculating $N_R(n) = 2N_f(n) - 3/2N_f(n-1) + ½N_f(n-2)$ using said most current detection value $N_f(n)$, the immediately preceding detection value $N_f(n-1)$, and the prior detection value $N_f(n-2)$.

4. The motor speed control apparatus as defined in claim 1, wherein said first calculating includes means for generating a predicted value of speed at a point of time later by a period of time $\Delta T$ taken for a speed control calculation than a point of time when the most current detection value $N_f(i)$ has been obtained, and an output $N_R(n)$ of said first calculating means is used as a speed feedback signal for controlling the speed of said motor.

* * * * *